April 10, 1956 — G. J. MELCHER — 2,741,509
TRACTOR MOVABLE IRRIGATION SYSTEM
Filed Oct. 27, 1952 — 3 Sheets-Sheet 1
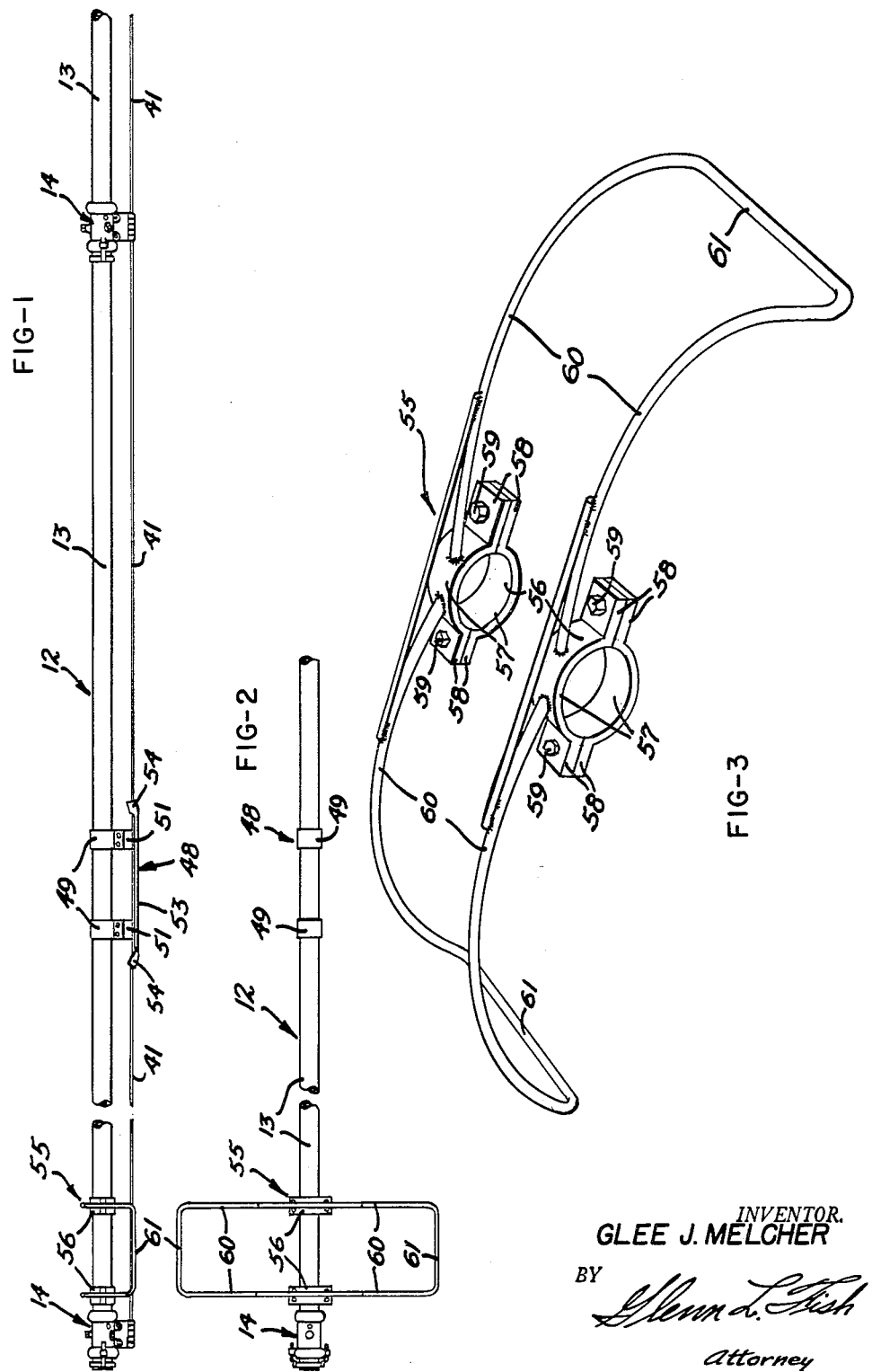
INVENTOR.
GLEE J. MELCHER
BY Glenn L. Fish
Attorney

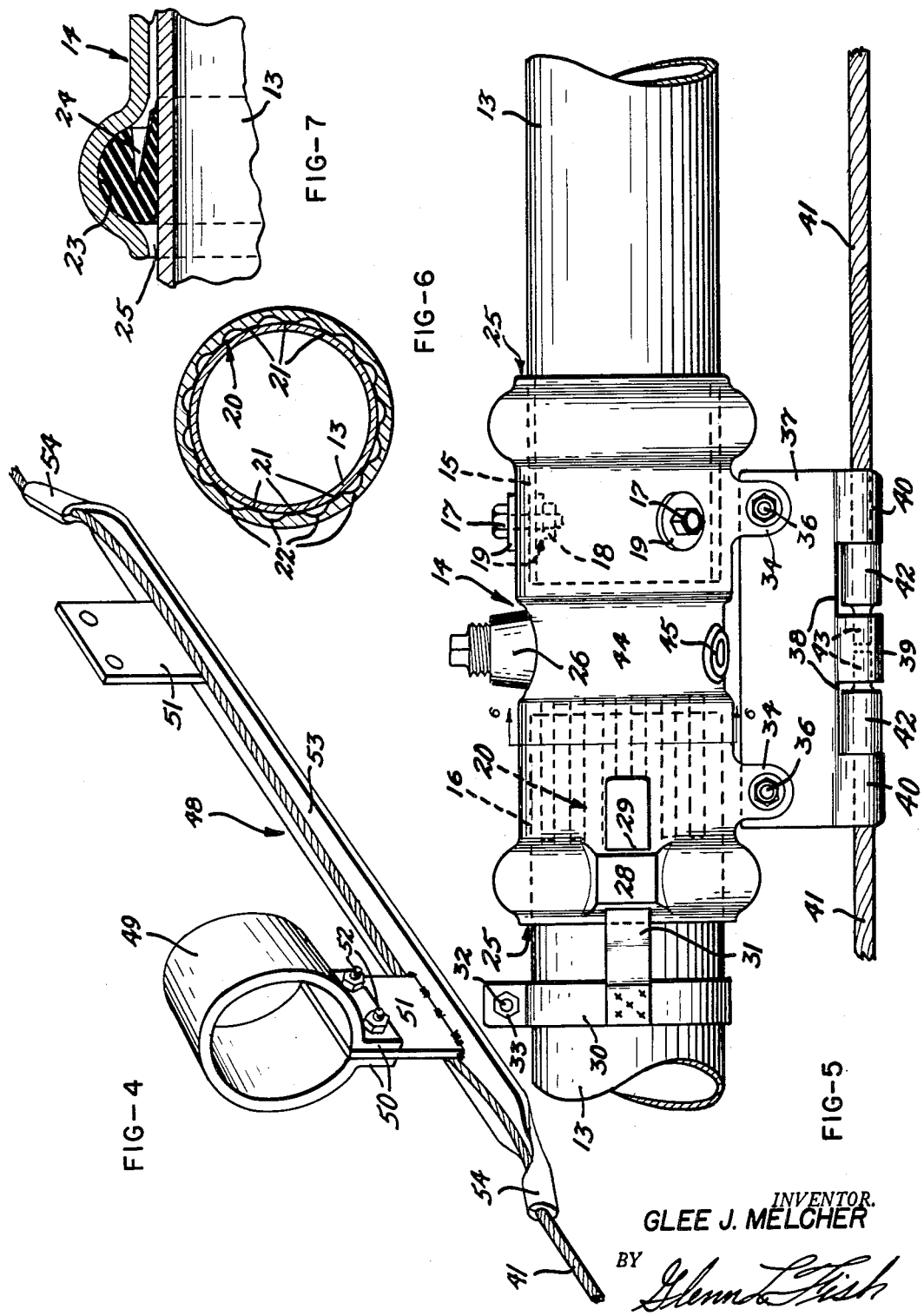

April 10, 1956  G. J. MELCHER  2,741,509
TRACTOR MOVABLE IRRIGATION SYSTEM
Filed Oct. 27, 1952  3 Sheets-Sheet 3
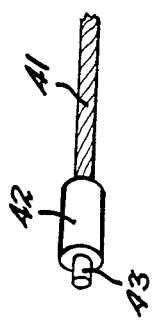
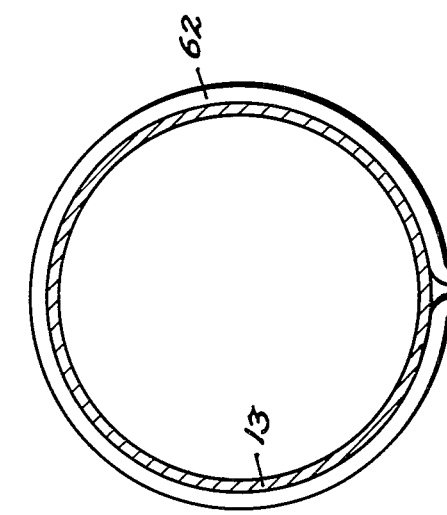
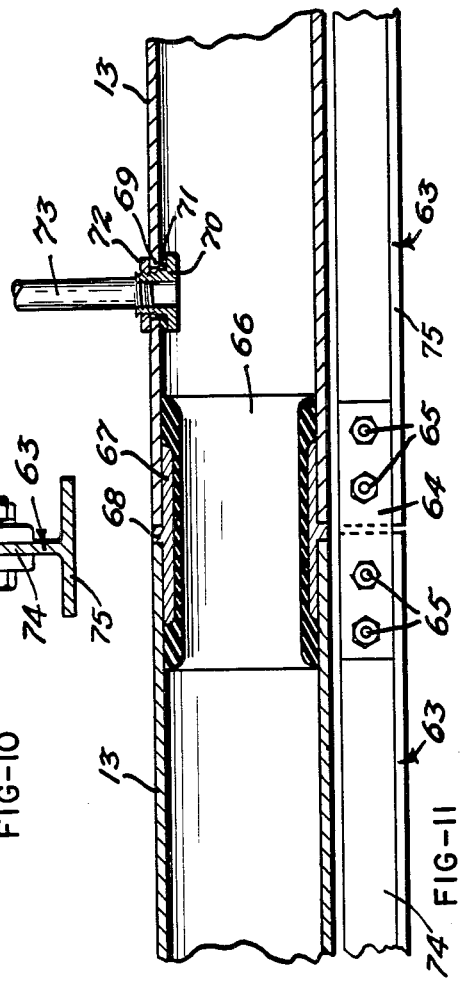
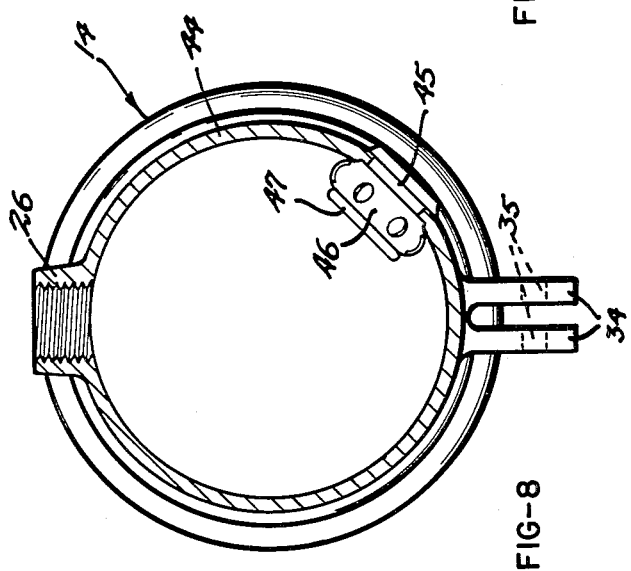
INVENTOR.
GLEE J. MELCHER
BY Glenn L. Fish
Attorney

United States Patent Office 2,741,509
Patented Apr. 10, 1956

2,741,509

TRACTOR MOVABLE IRRIGATION SYSTEM

Glee J. Melcher, Eugene, Oreg., assignor to R. H. Pierce Manufacturing Co., Eugene, Oreg., a corporation of Oregon Application October 27, 1952, Serial No. 317,099

11 Claims. (Cl. 299—47)

This invention is an irrigation system of the type including a movable fluid conduit.

It is one object of the invention to provide an irrigation system which is movable from place to place by means of a towing vehicle.

Another object of the invention lies in the provision of a tractor-moved irrigation system which is provided with a runner support to maintain the conduit above the surface of the ground and thereby prevent unnecessary wear to the conduit.

Another object of the invention lies in the provision of a tractor-moved irrigation system which includes outriggers at spaced intervals for eliminating tilting movement of the conduit over its supporting runner.

Another object of the invention lies in the provision of tubes and couplers therefor which form a circumferentially rigid conduit to preclude relative circumferential movement of the parts.

A further object of the invention lies in the provision of a tractor-moved irrigation system which is provided with a parallel cable secured at spaced intervals to the conduit and by means of which the conduit is towed, thus eliminating unnecessary end pull on the conduit.

A further object of the invention lies in the provision of a tractor-moved irrigation system having improved couplers adapted to secure the ends of the segmental cable.

Another object of the invention lies in the provision of a tractor-moved irrigation system which has automatic draining means to reduce the weight of the conduit to be moved.

These and other objects of the invention will become apparent during the course of the following description.

In the accompanying drawings, forming a part of this specification, and in which like numerals are employed to designate like parts, Figure 1 is a side elevation of a portion of an irrigation system embodying my invention;

Figure 2 is a top plan view of the same;

Figure 3 is a view in perspective showing one of the outriggers upon an enlarged scale;

Figure 4 is a view in perspective showing one of the supporting runners upon a further enlarged scale;

Figure 5 is an enlarged side elevation of a coupler and the adjoining ends of the tubes;

Figure 6 is a transverse cross section as at line 6—6 of Figure 5;

Figure 7 is a longitudinal fragmentary cross section taken through the sealing gasket and cooperating portions of the coupler and tube;

Figure 8 is a transverse cross section taken midway the length of the coupler shown in Figure 5 and having the plug and the cable securing plate removed;

Figure 9 is a fragmentary perspective view of the end of one cable showing the securing knob;

Figure 10 is a transverse cross section of a tube having a modified runner secured thereto; and Figure 11 is a longitudinal cross section taken through the adjoining coupled ends of tubes and having thereunder the modified runner shown in Figure 10.

The present specification will deal primarily with irrigation systems of the sprinkler type which are well known in the field of irrigation. However, I do not intend to limit the use of my invention to any one particular type of irrigation conduit, but desire to be limited only as required by the appended claims and the prior art.

Further, I will use the term "tractor" or "towing vehicle" as applying to any means of towing the irrigation system. I do not wish to be unduly limited by the term.

Presently there are a number of mobile irrigation systems which to some extent accomplish the purpose of making a sprinkler irrigation pipe movable from one place to another. Some of these, however, must be moved by hand, and it has been found that those which are movable only by manual labor require so much time to make a move in the field that the cost of irrigating the land rises materially. Some may be pulled with a towing vehicle, but the present mobile sprinkler systems which may be moved by a towing vehicle are supplied with wheels and various expensive contraptions, which also tend to increase the cost of irrigating a field and, further, it has been found that the wheels when disposed with their planes parallel with the axis of the tube unless pulled perfectly straight do not track and, therefore, cannot be used in row crops or crops where the contact of the wheels with the crop will cause damage thereof. My present invention seeks to overcome all of these disadvantages and thus provide an inexpensive irrigation system which is adapted to be moved by a tractor and which will do a minimum amount of damage to the crop being irrigated and naturally one which may be moved and put in operation within a minimum length of time.

Referring now more particularly to the drawings, it will be seen that I have provided a fluid conduit indicated in general by the numeral 12 and which comprises a plurality of axially aligned tubes 13 communicated by means of couplers 14. Reference to Figure 5 will show that the couplers 14 are each provided with axially disposed tube receiving sockets 15 and 16. The tube receiving socket 15 has an internal circumference substantially identical to the external circumference of its companion tube 13, and the tube has its marginal end portion secured therein by means of radially extending bolts 17 which pass through the wall of the socket 15 and the tube wall and are secured by internal nuts 18. Suitable fluid sealing washers 19 are provided under the bolt heads and nuts to prevent leakage thereby. The socket 16 is provided with a circumferentially undulatory face 20 which defines longitudinally extending ribs 21 having their crowns when taken together disposed in an arc substantially identical to the circumference of the tube 13, thus rigidly holding the marginal end portion of the tube and yet providing fluid passage through the valleys or depressions 22 which separate each rib 21.

Adjacent the ends of the coupler 14 I have provided annular internal recesses 23 which are adapted to contain sealing gaskets 24 which are also annular, and the recesses 23 at their open ends define tube receiving mouths 25.

Midway the length of the coupler 14 and at its top, I have provided an internally threaded upstanding boss 26 which communicates with the interior of the coupler and in which a standard (not shown) may be threadedly engaged to convey fluid from the conduit to a sprinkler head carried by the standard. However, in Figure 5, I have shown the boss plugged by means of a standard pipe plug 27.

To prevent torsional movement of tube 13 in socket 16, I have provided diametrically opposed outstanding bosses 28 and these are formed with apertures 29 which are axially parallel with the axis of tube 13. A clamping band 30 is releasably secured about the periphery of tube 13 and has spaced diametrically opposed arms 31 which are carried at their outer ends by the clamping band 30 and are disposed with their inner ends passed through the apertures 29. The clamping band 30 is provided with a suitable bolt 32 and clamping nut 33.

Each coupler is provided with longitudinally spaced pairs of transversely disposed ears 34 and each pair of ears has a transversely disposed bore 35 adapted to receive a clamping bolt 36 for fastening a securing plate 37 disposed downwardly at the bottom of the coupler 14. The plate 37 is provided at its lower edge with spaced open portions or openings 38 and these openings define therebetween a longitudinally extending sleeve 39 which is an integral portion of the plate 37. At the opposed ends of the openings 38 the plate is provided with inverted U-shaped yokes 40 which are open downwardly and are adapted to receive the body of a substantially nonextensile cable segment 41. Knobs 42 are fixedly secured on the ends of the cables 41 and have axially extending fingers 43 on their ends opposed to the cable segments 41. The fingers 43 are provided to be inserted in the sleeve 39 as shown in Figure 5 and thence the cable segment is shifted upwardly positioning the knob 42 in opening 38 and with the cable passing through the inverted U-shaped yoke 40, thus providing securing means for the towing cable.

Midway the length of the coupler 14, I have provided an annular restricted portion 44 which forms an abutment for the longitudinal inward movement of tubes 13, and in this portion I form an automatic fluid release valve 45, which is here shown to be one of the commercial type sold on the market under the trademark "Dry-Lift" and which comprises a rubber body having thin annular semi-circular wall 46 and a valve disc 47. When the fluid pressure within the coupler reaches its operating pressure, the pressure forces valve disc 47 against an internal seat in the body 45 sealing the drain valve against leakage. However, other types of drain systems may be employed which are adapted to drain the system when the fluid pressure is below normal operating pressures.

As will be seen in Figure 1, each cable segment 41 is substantially the same length as each tube 13 and has its ends secured in the plates 37 of successive couplers 14 extending parallel below its respective tube 13. The cables thus prevent spreading movement of the tubes 13 and couplers 14 and maintain the companion tube in its respective socket 16. Further, the cable provides a guiding means for the conduit 12 as it is being moved by a tractor (not shown).

At selected intervals along the conduit, preferably midway the length of each tube 13 but not restricted thereto, I have provided supporting runners 48. Each runner is provided with a pair of spaced clamping bands 49 which encircle the tube 13 and have depending ears 50 one disposed on each side of a companion leg 51 of a pair of longitudinally spaced legs. Bolts 52 extend through the ears 50 and companion leg 51 to secure the clamping band in frictional engagement about the tube 13 and to carry the leg 51. A longitudinally extending shoe or bar 53 is carried at the lower end of each pair of legs 51 and may be secured as by welding, and the ends of the bar 53 are formed with sleeves 54 which encircle a portion of the cable segment 41 and may be clamped thereon as by swaging. The sleeves 54 are disposed at an upward incline from the axis of the bar 53 and thus aid the bar in sliding over the ground.

To prevent the conduit from tilting transversely over the runners 48, I provide outriggers, indicated in general by the numeral 55, which are formed with spaced clamping bands 56 having upper and lower segments 57 which are provided with diametrically opposed ears 58 cooperating with companion ears, and a bolt 59 passes through adjoining ears of the band segments 57 and frictionally secures the clamping bands about a selected tube 13. The upper segments of the clamping bands 56 carry pairs of outwardly disposed downwardly curved arms 60, and the arms terminate at their outer ends in a connecting rod or runner 61 which are disposed in a horizontal plane spaced below the diameter of the clamping bands 56, thereby supporting the conduit above the surface of the ground. The distance from the horizontal diameter of the clamping bands 46 to the lower surfaces of the runners 61 is substantially the same as the dimension from the horizontal diameter of the clamping bands 49 to the lower surfaces of the bars 53. Therefore, it will be seen that the conduit is supported by multiple runners 48 against contact with the surface of the ground and against transverse tilting movement over the runners by the outriggers 55.

Before moving the conduit, the main supply valve is closed and the fluid pressure is thus lowered in the conduit. The drain valves 45 in each coupler open as the operating pressure is reduced and permit the fluid to drain from the conduit. The conduit is then reduced in weight to that of the metallic parts alone and may be moved with a towing vehicle.

When it is desired to move the conduit from one location to another, it is only necessary to secure, by means of a towing chain, a tractor to the end one of the cable segments 41, and with the conduit disconnected from the main supply line the tractor may be driven longitudinally with relation to the conduit and thus move the irrigation equipment. Reasonable curves may be traversed which are not beyond the ability of the conduit to bend. As the cable and runners form a channel or groove in the surface of the ground, the conduit will substantially follow the groove and thus will not mutilate the crop. It is admitted that the channel at a curve will be cut to a limited extent toward the center point of the curve arc. However, this can be considered when the crop is planted.

In Figures 10 and 11 I have shown a modified form of runner and couplers, wherein the tube 13 is provided with a plurality of clamping bands 62 which frictionally engage about the tubes 13 and carry at the lower side thereof an inverted T-shaped runner 63 including a vertical web 74 and a horizontal, ground engaging base or shoe 75. The runner 63 will extend the full length of the conduit, and will be formed in segments corresponding to the length of each tube 13 and the ends of adjacent segments will be united by means of strips 64 bolted at 65 thereto. The coupler is indicated at 66 as being an internal sleeve of rubber or the like and having thereabout an annular T-shaped metal band 67 for maintaining the sleeve in shape and providing an abutment 68 against which the end faces of the tubes 13 may impinge. The tubes may be drilled at 69 in locations where desired and an internally threaded and externally threaded collar 70, supplied with a suitable gasket 71 and secured by external nut 72, may be applied to communicate the interior of the tubes 13 with a standard 73 which will supply fluid to a sprinkler head (not shown). The outrigger described and shown may be employed with the disclosure of figures 10 and 11 to maintain its upright position.

Having thus described my invention, I desire to secure by Letters Patent and claim:

1. In an irrigation system, an elongated conduit and a runner for supporting said conduit in elevated position above the ground, said runner comprising a single elongate, narrow, ground engaging shoe positioned directly beneath the conduit in parallelism therewith, means extending between the shoe and the conduit for supporting the latter in said elevated position above the shoe, and outrigger means fixed to and extending laterally of the conduit to stabilize the conduit and prevent tilting thereof.

2. In an irrigation system comprising an elongated conduit, a plurality of runners of a width less than that of the conduit disposed at intervals along the conduit, each of said runners including a single, narrow, elongate, ground engaging shoe and supports extending upwardly from the shoe for maintaining the conduit above the ground, said ground engaging shoes being disposed in a single file directly beneath the conduit and parallel thereto, and draft means connecting said runners together whereby said conduit may be moved endwise without strain thereto by applying traction through said draft means to said runners, and outrigger means fixed to and extending laterally of the conduit to stabilize the conduit and prevent tilting thereof.

3. An irrigation system comprising an elongated conduit including a plurality of pipe sections disposed in end-to-end relation and a plurality of coupling means joining said pipe sections in communicating relation to each other, a plurality of narrow runners disposed at intervals beneath said conduit, a single one of said runners being disposed beneath an intermediate portion of each of said pipe sections, each of said runners including a single, narrow, elongate, ground engaging shoe positioned directly beneath the conduit and supports for supporting the conduit above the shoe, said shoes extending in a single file parallel to the conduit, a flexible, nonextensible cable system extending lengthwise beneath the conduit, means connecting each end of each of said runners to said cable system whereby said conduit may be moved endwise by applying traction thereto through said cable without straining the conduit, and outrigger means for preventing lateral tipping of the conduit.

4. An irrigation system comprising a plurality of pipe sections placed end-to-end and pipe couplers joining adjacent ends to form an elongate fluid conduit, a plurality of runners spaced longitudinally along and supporting said conduit, said runners each comprising spaced clamping bands encircling said pipe sections and carrying depending legs, and a ground engaging bar attached to said legs at their lower ends and extending parallel with said conduit for sliding over the surface of the ground and supporting the conduit thereupon, non-extensible towing means extending parallel with said conduit and secured thereto at spaced intervals, and outriggers supporting said conduit against transverse tilting movement.

5. An irrigation system as defined in claim 4 wherein the ends of the bar are bent to form longitudinally extending sleeves disposed at an upward incline, and said towing means is a cable extending through and clamped in said sleeves.

6. An irrigation system as defined in claim 4 wherein each coupler is provided with longitudinally spaced pairs of transversely bored ears depending therefrom, a securing plate releasably supported between said ears, said plate having spaced openings in its lower edge defining a longitudinally extending sleeve therebetween, inverted U-shaped yokes at the ends of said plate and axially aligned with said sleeve, said towing means being cables having knobs at the ends thereof, and axially extending fingers on the ends of said knobs and disposed within said sleeve with the knobs removably contained in said openings, whereby axial pull on said cables causes the knobs to bear against said yokes to impart moving force to said conduit.

7. In an irrigation system adapted to be moved by means of a towing vehicle, a plurality of axially aligned tubes, couplers uniting and communicating successive tubes, one end of each said coupler being rigidly united with a tube, the opposed end of the coupler having a socket for receiving the end of a second tube, diametrically opposed bosses at the mouth of the socket and on the peripheral face of the coupler, said bosses having apertures with their axes parallel with the axis of said tubes, a clamping band secured about the second named tube adjacent its end, diametrically opposed arms carried by the band and shiftable into said apertures, whereby rotary movement between the coupler and second named tube is avoided, cable securing means on each coupler, a cable extending parallel to the tubes and uniting said couplers, whereby spreading movement of the tubes out of the couplers is avoided, and means in each coupler for releasing the water contained in the system when the pressures are below normal operating pressures.

8. An irrigation system comprising an elongated conduit, a plurality of narrow runners disposed at intervals along the conduit, each of said runners including a single, narrow, elongate, ground engaging shoe and supports extending upwardly from the shoe for maintaining the conduit in spaced relation above the ground, said ground engaging shoes being disposed in a single file directly beneath the conduit and parallel thereto, a cable system extending lengthwise beneath the conduit, and means connecting each end of each of said runners to said cable system whereby said conduit may be moved endwise without straining the conduit by applying traction through the means of said cable system, and outrigger means fixed to and extending laterally of the conduit to stabilize the conduit and prevent tilting thereof.

9. An irrigation system comprising an elongated conduit, a plurality of narrow runners disposed at intervals along the conduit, each of said runners including a narrow, elongate, ground engaging shoe and supports extending upwardly from the shoe for maintaining the conduit in spaced relation above the ground, said ground engaging shoes being disposed in a single file beneath the conduit and parallel thereto, a cable system extending lengthwise beneath the conduit, means connecting each end of each of said runners to said cable system whereby said conduit may be moved endwise without straining the conduit by applying traction through the means of said cable system, and a plurality of double outriggers fixed to said conduit at spaced intervals therealong, said outriggers comprising arms extending outwardly at each side of the conduit, and narrow outrigger runners extending parallel to the conduit in dependent relation to the ends of said arms to engage the ground at the level of said ground engaging shoes whereby to prevent tilting movement of the conduit.

10. An irrigation system comprising a plurality of pipe sections placed end-to-end and pipe couplers joining adjacent ends of said sections to form a continuous fluid conduit, a plurality of runners disposed in single file parallel to the conduit with at least one of such runners beneath each of said pipe sections, a plurality of non-extensible cables associated one with each of said pipe sections and each of said cables being substantially as long as its associated pipe section, said cables being secured to said runners endwise thereof, a cable connector depending from each of said couplers, means on the ends of said cables for removably joining adjacent cable ends together through said cable connectors whereby said conduit may be moved endwise as a whole by applying traction thereto through said cables and connectors, and outrigger means spaced along the conduit and including dependent outrigger runners at each side of the conduit to resist lateral tipping of the conduit.

11. The construction set forth in claim 10 wherein said outrigger means extend laterally on each of the opposite sides of the conduit to resist lateral tipping of the conduit.

References Cited in the file of this patent

UNITED STATES PATENTS

| Re. 24,041 | Hondeville | July 19, 1955 |
| 664,240 | Doehring | Dec. 18, 1900 |
| 738,271 | Astle | Sept. 8, 1903 |
| 872,490 | Williamson | Dec. 3, 1907 |
| 902,863 | Darrow | Nov. 3, 1908 |
| 1,330,123 | Kearney | Feb. 10, 1920 |
| 2,561,296 | Stout | July 17, 1951 |
| 2,593,025 | Hanson | Apr. 15, 1952 |
| 2,678,844 | Hondeville | May 18, 1954 |